Dec. 1, 1942.  R. E. FEARON  2,303,688
WELL SURVEYING METHOD AND APPARATUS
Filed May 14, 1940
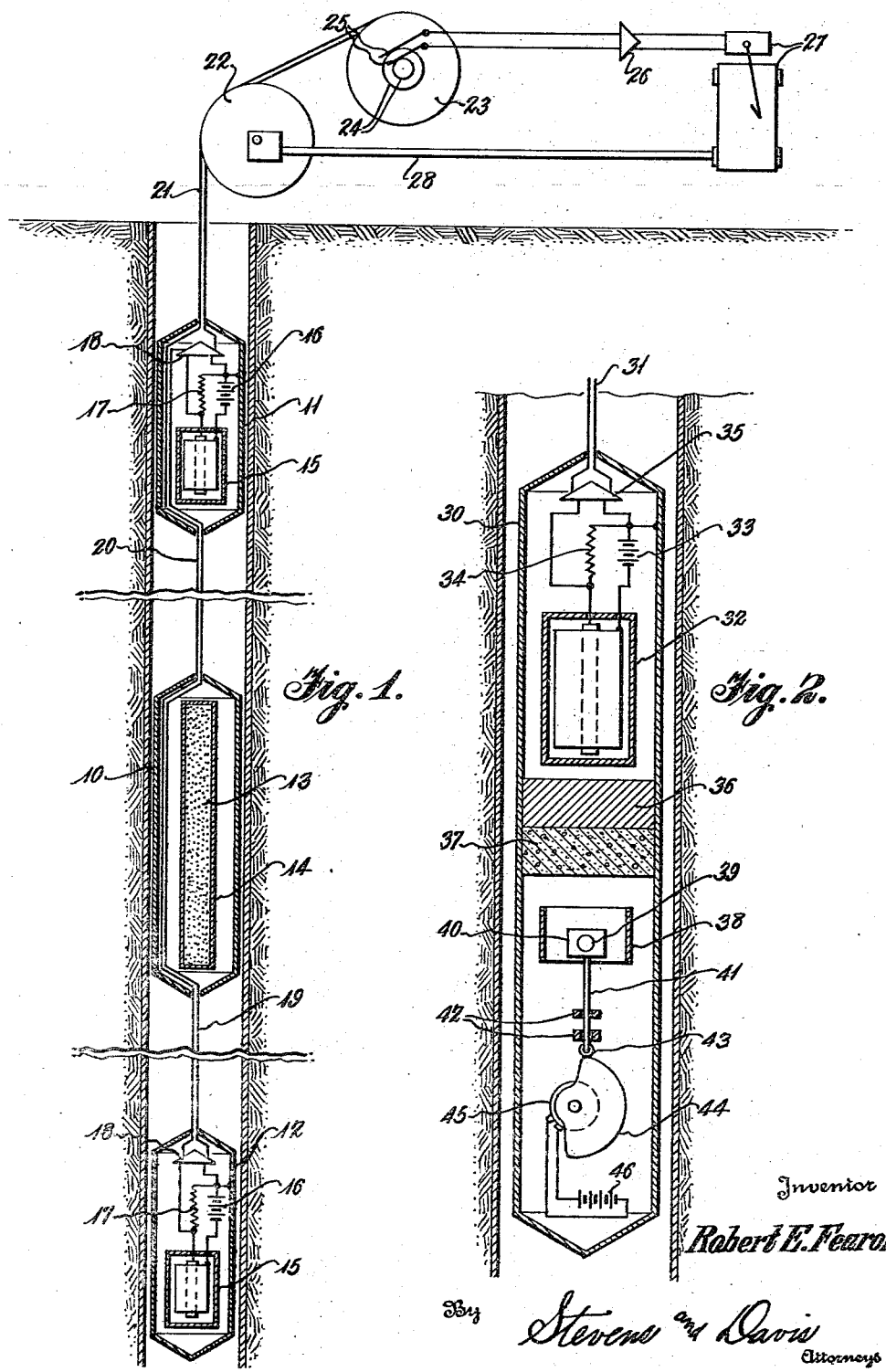
Inventor
Robert E. Fearon
By Stevens and Davis
Attorneys

UNITED STATES PATENT OFFICE 2,303,688

WELL SURVEYING METHOD AND APPARATUS

Robert Earl Fearon, Tulsa, Okla., assignor to Well Surveys, Incorporated, Tulsa, Okla., a corporation of Delaware Application May 14, 1940, Serial No. 335,187

13 Claims. (Cl. 250—83.6)

This invention relates to geophysical prospecting and more particularly to a form of subsurface prospecting in which the nature of subsurface strata is determined by their reaction to radioactive radiation, in situ, that is without removing them to the surface of the earth.

The possibility of inserting an instrument in a drill hole or other opening in the earth and, through that instrument, measuring or determining the characteristics of the surrounding formation have long been known. Further, it is known that by inserting a detector of radioactive radiations into a drill hole, a great deal can be learned about the nature of the formations lying along the drill hole, even though the drill hole is cased with a heavy steel casing. Still further it has been suggested that a source of radioactivity may be lowered into the drill hole with the detector of radioactivity and properly shielded therefrom so that the direct radiations will not be detected but the detector will detect scattered or reflected radiations or secondary radiations from the surrounding strata caused by the primary source of radiation.

The present invention is a further improvement in the same general method of subsurface prospecting. According to this invention it has been discovered that advantage can be taken of the fact that the very common metal aluminum has a time constant or half life period of the right order of magnitude to be easily observable and of an order of magnitude quite different from that of any of the other commonly encountered substances. Thus, the scientific fact upon which this invention is predicated is that $$Al^{27}_{13}$$

which is the principal isotope of aluminum, absorbs neutrons upon being bombarded thereby, is transmuted into a different element or elements and gamma rays are emitted over a period of time which is of the right order of magnitude to be measurable in well surveying. From textbooks on the subject, there are apparently two radioactive materials that exist during the transmutation, the half life period of one being 10 minutes and the half life period of the other being 2.3 minutes.

Under these circumstances, if a formation containing aluminum is bombarded with neutrons and the re-radiation of gamma rays therefrom observed, the intensity of the gamma radiation will steadily increase until a time is reached where the decay in radiation due to the expiration of the life period of the radioactive substances formed, equals the increase in radiation from the new radioactive substances that are being formed. Thus, at first, the gamma ray radiation intensity will increase because new radioactive material is constantly being formed and sufficient time has not elapsed for it to decay appreciably. However, as the life period of the first formed radioactive substances begins to expire, a balancing factor will enter which tends to stop the increase in gamma ray radiation and eventually the system will reach equilibrium.

Under the same circumstances if no aluminum were present the returning gamma ray radiations would immediately go to their highest intensity and would then remain there until the neutron bombardment stopped at which time they would immediately cease. In case aluminum is present, activity would persist after the bombardment is stopped, decaying at a rate characteristic of the artificially radioactive bodies produced by the bombardment of aluminum.

In its broadest aspect the present invention comprises the determination of the aluminum content of a geological formation or even a sample of material by bombarding the formation or sample with particles such as neutrons and observing the manner in which the intensity of the gamma rays radiated from the sample or formation builds up or holds over after the bombardment ceases.

This invention may be specifically applied to subsurface geophysical prospecting by lowering a source of bombarding radiations into a drill hole or other opening in the ground and with it lowering one or more appropriate measuring instruments for the returning radiations. Theoretically, at least, a source of neutrons may be lowered quickly to a desired location and a detector of gamma radiations, either placed previously at that location or lowered with the source of neutrons, may be used to measure the build-up time of the induced gamma radiations. In such a case, of course, a sufficient shielding will have to be provided between the source of neutrons and the measuring instrument to prevent the source of neutrons from directly affecting the measurement. Similarly, the source of neutrons may be quickly removed and the time of decay of the gamma radiations measured by the gamma ray detector.

A more satisfactory way of accomplishing this same result is to use a source of neutrons that can be interrupted at will or periodically such as is the source of neutrons described in this inventor's application Serial Number 326,510 filed March 28, 1940. Preferably, if such an arrangement is used the mechanical operation is arranged so that the neutron stream is sharply interrupted but the time intervals between interruptions are much longer than were mentioned as preferred in the above application. Usually these time intervals will be several minutes in duration rather than fractions of a second as was indicated as preferred according to that application.

The arrangement may be still further modified to adapt it to the making of continuous logs. Thus the measuring instruments may be continuously raised or lowered in a bore hole by suspending a source of radiation and one or more measuring instruments from the same cable, properly spacing them apart and raising and lowering the combination in a drill hole at a steady rate such as will cause the source of radiations and the measuring instruments to pass any given point in the right order and at the right time interval. Thus, if the source of radiations is spaced five feet below a detector of gamma rays and the combination is lowered into a drill hole at the rate of five feet per minute the detector will pass any particular point just one minute after the source of neutrons has passed. If no aluminum is present there will be no residual gamma ray radiations to be measured, and if aluminum is present gamma rays will still be in the process of being emitted and will be measured.

In connection with this type of measurement, the measuring instrument will also measure the natural radioactivity of the strata through which it passes but this factor can be eliminated from the final determination by making a measurement of the natural radioactivity alone and subtracting it from the measurement of natural radioactivity plus that due to the presence of aluminum.

It will be immediately apparent from the foregoing description of the general principles of this invention that a very considerable number of arrangements both of apparatus and of method steps can be used in accomplishing the object of this invention according to its general principles. Two desirable embodiments are shown in the accompanying drawings and described in the following description in detail. A study of these embodiments and the description of them will yield a better understanding of the details of this invention and its many advantages but it is to be understood that the embodiments are but illustrative and not in any sense as limits of the scope of this invention.

In the drawing:

Figure 1 is a diagrammatic illustration of a device adapted for the continuous surveying of the strata adjacent a well bore, that is a device which operates during the continuous movement of the primary source of radiation and the detecting instruments upward or downward in a well bore; and Figure 2 is a diagrammatic illustration of a device better adapted to individual determinations at the specific depths where the device is either operated at a fixed depth or where the depth is changed only between determinations.

As shown in Figure 1 of the drawing the principles of this invention are embodied in a device for continuously measuring the phenomena of interest as the measuring instruments and source of neutron bombardment are raised or lowered in a well bore. Essentially this device consists of a chamber or capsule 10 containing a source of neutrons, a pair of sealed capsules 11 and 12, one above and one below the neutron source and each containing an ionization chamber for measuring gamma rays and the necessary supporting cables and recording equipment.

The casing 10 and the source of neutrons 13 are sufficiently long so that as the device is operated and the casing raised or lowered in the well it will take the neutron source at least several minutes to pass any given location and there will thus be an opportunity to establish the secondary radiations, the continuance of which is to be measured. Thus, if the device is to be raised or lowered in the well at the rate of one foot per minute the neutron source 13 should be at least two or three feet long. If the device is to be raised or lowered faster than this, the neutron source should be correspondingly longer.

As a source of neutrons it has been found preferable to use a mixture of radiothorium or mesothorium and boron or beryllium or one of their salts. By enclosing this mixture of materials in a long cylindrical tube 14 of lead or other heavy metal, gamma rays may be almost entirely eliminated at the source. In some cases it will be desirable to also enclose the tube in a layer of paraffin or other hydrogenaceous material that will slow down the neutrons and thus make them more reactive.

Each of the measuring units 11 and 12 includes an ionization chamber 15 so constructed as to make it as sensitive as possible to gamma rays and as insensitive as possible to neutrons and other radiations. Such ionization chambers preferably include a pair of electrodes one of which consists of an iron rod about six inches long and the other a cylindrical iron sleeve about two inches in diameter and surrounding the rod. They may be filled with argon under a pressure of 1500 to 2000 pounds per square inch.

Also contained within each of the measuring instrument housings 11 and 12 is a battery 16 and a resistor 17 having a resistance of around $10^{12}$ ohms. The battery preferably has a voltage of around 150 volts. Across each resistor 17 is connected the input of an amplifier 18 and the outputs of these amplifiers are connected in opposition through cables 19 and 20 which support the lower measuring instrument from the source of neutrons and the source of neutrons from the upper measuring instrument respectively. From the upper measuring instrument 11 the whole assembly is supported in the well by a cable 21 which also serves the purpose of carrying the combined outputs of the two amplifiers to the surface.

At the surface the cable 21 passes over a measuring wheel 22 and on to a cable reel 23 which is driven by a source not shown to raise and lower the apparatus in the well. From the cable reel 23, the currents indicating the measurements are taken through slip rings 24 and brushes 25 and conveyed to a surface amplifier 26 and from there to a recorder 27. The tape of the recorder may be driven by any suitable connection such as the mechanical connection 28 from the measuring wheel 22 so as to correlate the measurements with the depth at which they are taken. In actual practice it is preferred to use an electrical transmission system such as the "Selsyn" transmission system instead of the mechanical connection shown in Figure 1.

In operation the device may be either raised or lowered in the well at the proper rate so that the ionization chamber following the source of neutrons will reach each of the positions passed by the source of neutrons at a time interval thereafter which is within the time that the gamma radiations from aluminum will continue. Thus the detector that follows the source of neutrons either going down into the well or coming up out of the well will measure the natural gamma radiations from the surrounding strata plus any radiations due to the presence of aluminum. The measuring instrument preceding the source of neutrons, however, will measure only the naturally emitted gamma radiations and when the two measurements are combined the resultant measurement will be that resulting from the aluminum only.

Obviously, if the direction of current flow to the recorder 27 affects the direction of movement of the recorder needle the recording will be made in one direction on the tape when the instruments are lowered into the well and in the other direction when they are being raised. However, the recorder may be so arranged that the direction of current will have no effect on the direction in which the recorder needle moves and thus so that the recorder needle will move in the same direction regardless of the direction of the current to it. In that case the direction of movement of the instruments will make no difference and the indications on the recorder tape will always be in the same direction.

Many modifications may be made in the device shown in Figure 1. As examples, heavy shields may be placed at the top and bottom of the casing 10 which contains the source of neutrons so that neutrons will not pass directly up or down the well and affect the ionization chambers above or below the source. Further, ionization chamber arrangement such as shown in application Serial Number 325,880, filed March 25, 1940, by Robert Earl Fearon may be used to give accurate readings of gamma ray intensities without the inclusion of any factor due to neutrons. Furthermore, methods of transmitting the readings to the surface such as those disclosed in the following applications may be used:

| Serial Number | Filed | Inventor |
| --- | --- | --- |
| 279,577 | June 16, 1939 | Serge A. Scherbatskoy. |
| 299,767 | Oct. 16, 1939 | Robert E. Fearon. |
| 311,217 | Dec. 27, 1939 | Do. |
| 311,218 | do | Do. |
| 311,219 | do | Do. | also, the method of eliminating the effect of closely lying sources of radio activity as shown in application Serial Number 288,456, filed August 4, 1939, by Serge A. Scherbatskoy may be incorporated. The recorder may be of any desired type, not necessarily the mechanical type shown, the amplifier on the surface may be eliminated or the measurements made by the two ionization chambers may be separately recorded and the results subtracted by other means. Still other modifications will readily occur to those skilled in the art.

As shown in Figure 2 an entirely different type of device may be used if it is desired only to make measurements at particular localities or if it is desired to make specific studies of very short lengths of bore hole. For this purpose there may be provided, as shown in Figure 2, a single housing 30 suspended by a cable 31 containing the usual connections to the surface equipment. In the upper part of this housing may be the usual ionization chamber 32, battery 33 and resistor 34, with an amplifier 35 having its input connected across the resistor. Below the ionization chamber 32 is preferably positioned a double shield of cadmium, gadolinium, or other material or materials suitable for absorbing gamma rays and neutrons, 36 and hydrogenaceous material, 37. Such a shield if of sufficient thickness will completely cut out any neutrons or gamma rays that would otherwise directly pass from the source of neutrons to the ionization chamber.

Below these shields may be positioned a source of neutrons that comprises a short cylinder 38 of a neutron emitting material such as boron, beryllium or the like and within this short cylinder a source of alpha particles 39 such as radiothorium, mesothorium or radon. Surrounding the source of alpha particles there may be positioned a cup shaped shield 40 carried on a rod 41 which is slidable in guide 42 so that it can slide up and down and thus either shield the neutron emitting material from the source of alpha particles or permit its exposure.

At its lower end the supporting rod 41 carries a cam follower 43 which rides on a cam 44 driven by a motor or other source of power 45. In case an electrical motor is used it may be powered by any suitable source such as a battery 46. Such a motor will usually contain within its housing the necessary gearing to so reduce its speed that the cam turns relatively slowly and the shield, by reason of the shape of the cam, remains in its operative position for a period of several minutes and then is permitted to drop into an inoperative position so that the alpha particles may impinge on the neutron generating cylinder and cause neutrons to be expelled into the surrounding strata. Also, by reason of the shape of the cam the movements of the shield are relatively sudden so that the neutron bombardment starts and stops quite sharply.

With such a device lowered to any given level the record is one of the building up, duration and decay of the returning radiations and from what has already been said it will immediately be apparent that the shape of these curves will give an accurate indication of the presence or absence of aluminum.

The use of this particular method of observation in connection with the detection of aluminum has been emphasized especially since aluminum is an extremely abundant element, and a means of detecting it would prove very useful in making stratigraphic correlations, and for obtaining subsurface information useful for finding petroleum. However, there are some other materials, such as rhodium, indium and copper which, though less common are also of considerable value for this purpose, since they are also capable of being detected by the means described in this application. The use of the methods disclosed here for the purpose of detecting these valuable ores and minerals, will be immediately apparent from the foregoing disclosure, and the employment of the method for that purpose is merely another illustration of the general usefulness of the procedure herein disclosed.

I claim:

1. A method of geophysical prospecting that comprises continuously exposing successive regions of a formation about which information is desired to bombardment with neutrons, each region being exposed for a sufficient period of time to establish secondary gamma ray radiations from any aluminum present, simultaneously and also continuously measuring the intensity of gamma rays radiated from successive regions of said formation that will a definite time thereafter be exposed to neutron bombardment, simultaneously and also contiuously measuring the intensity of gamma ray radiation from successive areas of said formation that already have at a definite time previously been exposed to neutron bombardment and combining said measurements to obtain an indication of the aluminum content of the formation.

2. A method of geophysical prospecting that comprises continuously exposing successive regions of a formation about which information is desired to bombardment with neutrons, each region being exposed for a sufficient period of time to establish secondary gamma ray radiations from any aluminum present, simultaneously and also continuously measuring the intensity of gamma rays radiated from successive regions of said formation that will thereafter be exposed to neutron bombardment, simultaneously and also continuously measuring the intensity of gamma ray radiations from successive regions of said formation that already have at a definite time previously been exposed to neutron bombardment, combining said measurements, and continuously recording the place of making said second measurement in correlation therewith to obtain an indication of the aluminum content of the formation.

3. A method of geophysical prospecting that comprises continuously exposing successive regions of a formation about which information is desired to bombardment with neutrons, each region being exposed for a sufficient period of time to establish secondary gamma ray radiations from any aluminum present, simultaneously and also continuously measuring the intensity of gamma rays radiated from successive regions of said formation that will thereafter be exposed to neutron bombardment, simultaneously and also continuously measuring the intensity of gamma ray radiation from successive regions of said formation that already have at a definite time previously been exposed to neutron bombardment, combining said measurements, and continuously recording the places at which both of said measurements are made in correlation with said measurements to obtain an indication of the aluminum content of the formation.

4. A method of geophysical prospecting that comprises continuously exposing successive areas of the formation about which information is desired to the influence of primary radiations and determining the strength of gamma radiations induced in the said formation at a predetermined time interval after the said primary radiations have been removed.

5. A method of geophysical prospecting that comprises subjecting a material about which information is desired to bombardment with primary radiations, ceasing said bombardment and at a predetermined time interval thereafter measuring the secondary radiation emanating from said formation.

6. A method of geophysical prospecting to obtain desired information about selected material which comprises measuring the gamma radiations that may emanate naturally from said material, bombarding said material with primary radiations, ceasing said bombardment and at a predetermined time interval thereafter measuring the gamma radiations emanating from said material.

7. A device for geophysical prospecting that comprises a source of primary radiations positioned within a casing as a unit, and two detectors of gamma rays positioned within separate casings as separate units, the unit containing the source of primary radiations being positioned between the units containing the detectors and each of said units being spaced a predetermined distance apart.

8. A method of geophysical prospecting that comprises subjecting a geological structure about which information is desired to bombardment with neutrons and at a time interval after bombardment has ceased but within the lifetime of artificially radioactive materials produced by the neutron bombardment, measuring the intensity of the gamma radiation as an indication of the abundance of the materials, the time interval being less than one hour.

9. A method of geophysical prospecting that comprises subjecting a geological structure about which information is desired to bombardment with radiation from radioactive substances and a time interval after bombardment has ceased but within the lifetime of artificially radioactive materials produced by the bombardment, measuring the intensity of the gamma radiation as an indication of the abundance of the materials, the time interval being less than one hour.

10. A method of geophysical prospecting that comprises subjecting a material about which information is desired to bombardment with neutrons for a time interval within the lifetime of an artificially radioactive nucleus of the type produced in said material by neutron bombardment, and after bombardment has ceased but within a similar time interval measuring the intensity of gamma rays produced by the neutron bombardment as an indication of the geological character of the material, the time interval being less than one hour.

11. A method of geophysical prospecting that comprises subjecting a material about which information is desired to radiations of radioactive origin for a period of time within the lifetime of an artificially radioactive substance produced in the material by the radiation and at a time interval after the primary radiation has ceased but within the lifetime of the said substance, measuring the intensity of radiations emitted by the substance as an indication of the geological character of the material, the time interval being less than one hour.

12. A method of geophysical prospecting that comprises subjecting a material about which information is desired to bombardment with neutrons and measuring at a predetermined time interval after bombardment has ceased, the intensity of the resultant gamma ray radiation from the material.

13. A method of geophysical prospecting that comprises subjecting a material about which information is desired to radioactive radiation and measuring at a predetermined time interval after radiation has ceased, the intensity of the resultant radiation from the material.

ROBERT EARL FEARON.